US009152721B1

(12) United States Patent
Igarashi et al.

(10) Patent No.: US 9,152,721 B1
(45) Date of Patent: *Oct. 6, 2015

(54) PROMPT FOR QUERY CLARIFICATION

(71) Applicant: GOOGLE INC., Mountain View, CA (US)

(72) Inventors: Hisakazu Igarashi, Seattle, WA (US); Charles G. Bird, Sammamish, WA (US); Andrew Moedinger, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,161

(22) Filed: Oct. 21, 2014

Related U.S. Application Data

(63) Continuation of application No. 13/934,601, filed on Jul. 3, 2013, now Pat. No. 8,898,129, which is a continuation of application No. 12/338,374, filed on Dec. 18, 2008, now Pat. No. 8,484,190.

(60) Provisional application No. 61/014,719, filed on Dec. 18, 2007.

(51) Int. Cl.
*G06F 17/30* (2006.01)
*H04L 29/12* (2006.01)

(52) U.S. Cl.
CPC .... *G06F 17/30864* (2013.01); *G06F 17/30867* (2013.01); *H04L 61/609* (2013.01)

(58) Field of Classification Search
CPC ................................................. G06F 17/30657
USPC .................................................. 707/706, 722
See application file for complete search history.

(56) References Cited

U.S. PATENT DOCUMENTS

| | | | |
|---|---|---|---|
| 6,754,647 B1 | 6/2004 | Tackett et al. | |
| 7,210,098 B2 * | 4/2007 | Sibal et al. | 715/205 |
| 7,444,327 B2 | 10/2008 | Watson et al. | |
| 8,484,190 B1 | 7/2013 | Igarashi et al. | |
| 8,744,837 B2 * | 6/2014 | Heo et al. | 704/9 |
| 8,898,129 B1 | 11/2014 | Igarashi et al. | |
| 2003/0182622 A1 * | 9/2003 | Sibal et al. | 715/511 |
| 2007/0136251 A1 | 6/2007 | Colledge et al. | |
| 2007/0162422 A1 | 7/2007 | Djabarov | |
| 2008/0021884 A1 | 1/2008 | Jones et al. | |
| 2008/0022211 A1 | 1/2008 | Jones et al. | |
| 2009/0117885 A1 | 5/2009 | Roth | |
| 2011/0238662 A1 | 9/2011 | Shuster et al. | |
| 2012/0101807 A1 * | 4/2012 | Heo et al. | 704/9 |

* cited by examiner

*Primary Examiner* — Baoquoc N To
(74) *Attorney, Agent, or Firm* — Fish & Richardson P.C.

(57) ABSTRACT

Systems, methods, and computer program products are provided for query clarification. In general, one aspect of the subject matter described in this specification can be embodied in computer-implemented methods that include the actions of receiving in a search interface a user input associated with a search query; determining whether the associated search query is a trigger query, the trigger query being a query identified for clarification; when the search query is a trigger query, prompting the user for additional information to form a clarified search query, the clarified search query including the additional information, the prompting occurring prior to submission of the search query to a search system; and submitting the clarified search query to the search system.

21 Claims, 9 Drawing Sheets

PROMPT FOR QUERY CLARIFICATION

CLAIM OF PRIORITY

This application is a continuation of U.S. patent application Ser. No. 13/934,601, filed on Jul. 3, 2013, entitled "Prompt For Query Clarification", which claims priority to U.S. patent application Ser. No. 12/338,374, filed on Dec. 18, 2008, entitled "Prompt For Query Clarification", which in turn claims priority to Provisional U.S. Patent Application Ser. No. 61/014,719, filed on Dec. 18, 2007, entitled "Prompt For Query Clarification". The entire contents of the prior applications are hereby incorporated by reference.

BACKGROUND

The present disclosure relates to search query clarification.

Internet search engines aim to identify resources (e.g., web pages, images, text documents, processes, multimedia content) that are relevant to a user's needs and to present information about the resources in a manner that is most useful to the user. In response to a query submitted by a user, search engines return search results referring to resources identified as relevant to or matching the query. Unfortunately, a user submitted query may include terms that do not align well with the intentions of the user, for example, if there is ambiguity in the meaning of the query terms, or the term might not convey full intent of the user. Even if the search results returned are relevant objectively to the user submitted query, the results may not be relevant to or may be broader or narrower than the user's subjective needs. If a user is dissatisfied with the search results returned for a query, the user can attempt to refine the original query to better match the user's needs.

SUMMARY

Systems, methods, and computer program products are provided for query clarification. In general, one aspect of the subject matter described in this specification can be embodied in computer-implemented methods that include the actions of receiving in a search interface a user input associated with a search query; determining whether the associated search query is a trigger query, the trigger query being a query identified for clarification; when the search query is a trigger query, prompting the user for additional information to form a clarified search query, the clarified search query including the additional information, the prompting occurring prior to submission of the search query to a search system; and submitting the clarified search query to the search system. Other embodiments of this aspect include corresponding systems, apparatus, and computer program products.

These and other embodiments can optionally include one or more of the following features. Determining whether the associated search query is a trigger query includes comparing the user input with a collection of trigger queries. Determining whether the associated search query is a trigger query includes predicting the associated search query from the user input where the user input is a portion of the associated search query. The search query is a trigger query if the predicted associated search query is a trigger query and the confidence in the prediction exceeds a specified threshold score.

The method further includes using the additional user input to update the predicted associated search query to form the clarified search query and removing the prompt for additional information if the confidence that the updated predicted associated search query is a trigger query falls below the threshold value. Prompting the user for additional information includes modifying the search interface to include a menu with one or more items of suggested additional information. Prompting the user for additional information includes modifying the search interface to include a suggestion of additional information.

The method further includes sending the user input to a query server; receiving one or more predicted trigger queries based on the user input; comparing additional user input completing the search query with the one or more predicted queries; and prompting the user for the additional information when the completed search query corresponds to a particular predicted trigger query. Prompting the user includes suggesting one or more locations associated with the user.

Particular embodiments of the invention can be implemented to realize one or more of the following advantages. Prompting users to clarify queries before searching reduces time lost due to overly broad search results. The clarified query generated from a prompt can increase the likelihood of reaching the desired information in a way that is comprehensive and customized to a user's need. This can eliminate the need to use secondary sources (e.g., review sites or yellow pages) to further clarify an overly broad query. For example, those secondary sources can be limited, e.g., to subscription or paid business members. Additionally, identifying the desired information using a secondary source can lead to additional operations such as separately searching for a map or directions to a particular address found on such sites.

One or both of a remote or local model can be used to identify trigger queries for prompting the user for additional information that is missing from the trigger query in order to provide more relevant results than a general query. The remote model can provide higher precision (the triggering of a prompt is correct) and recall (prompt is provided when needed) in identifying trigger queries compared with a locally stored model. As a result, more relevant prompt suggestions can be provided to the user in response to an input query without providing unnecessary prompts. Prompts with high relevance reduce time lost to inaccurate or over broad searching.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
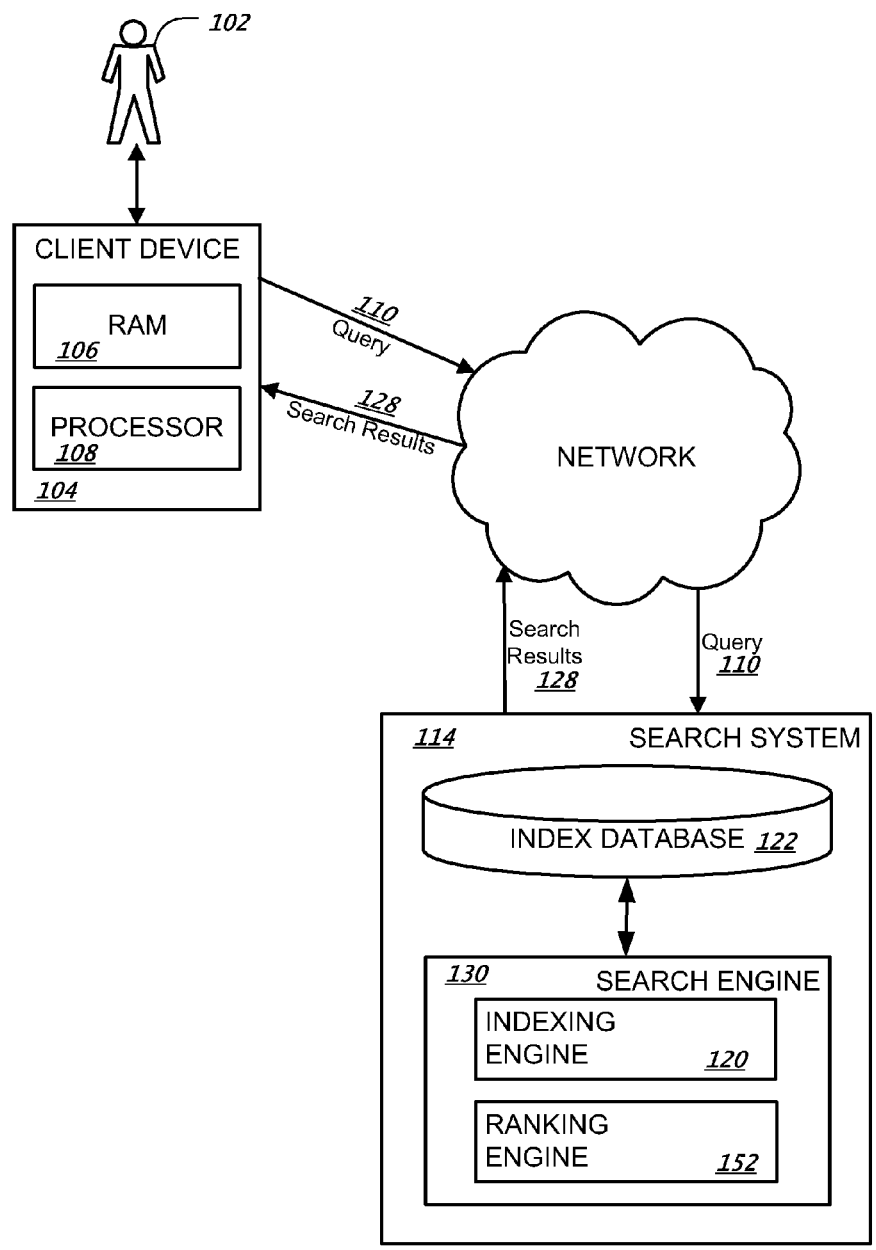
FIG. 1 shows an example search system.

FIG. 1 shows an example search system 114 for providing search results relevant to submitted search queries as can be implemented in an internet, an intranet, or another client and server environment. The search system 114 is an example of an information retrieval system in which the systems, components, and techniques described below can be implemented.

A user 102 can interact with the search system 114 through a client device 104 (e.g., a personal computer, a mobile telephone, a personal digital assistant, a mobile audio or video player, a game console, or a combination of one or more of them). For example, the client 104 can be a computer coupled to the search system 114 through a local area network (LAN), e.g., an enterprise intranet, or a wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can connect to a search engine 130 within a search system 114 to submit a query 110. When the user 102 submits a query 110, the query 110 is transmitted through one or more wired or wireless networks to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., as a search results web page to be displayed in a web browser running on the client device 104).

When the query 110 is received by the search engine 130, the search engine 130 identifies relevant resources. The search engine 130 will generally include an indexing engine 120 that actively searches a corpus of resources (e.g., web pages, images, or news articles on an intranet or the Internet) to index the resources found in that corpus, and stores index information for the resources in an index database 122. This index database 122 is used to identify resources that match the query 110.

The search engine 130 will generally include a ranking engine 152 (or other software) to rank the resources related to the user query 110. The ranking of the resources can be performed using conventional techniques for determining an information retrieval score for indexed resources in view of a given query. The relevance of a particular resource with respect to a particular query term or to other provided information may be determined by any appropriate technique. The search engine 130 can transmit the search results 128 through the network to the client device 104 for presentation to the user 102.

Figure 2:
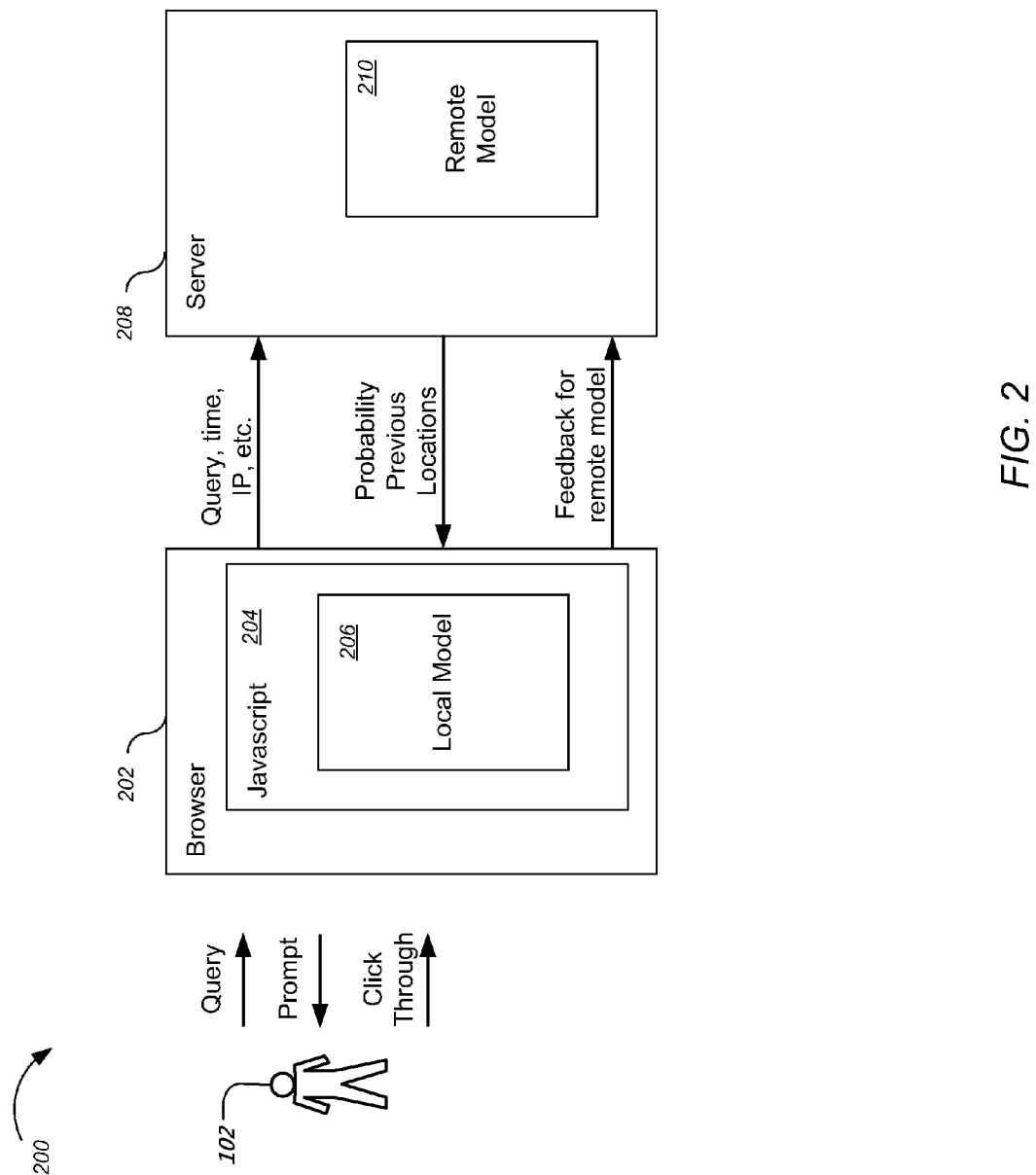
FIG. 2 shows an example system for prompting query clarification.

FIG. 2 shows an example system 200 for prompting query clarification. The system 200 includes the user 102 interacting with a browser 202 on a client device (e.g., client device 104). The browser 202 receives or locates scripts 204 (e.g., JavaScript, AJAX, etc.) that are used to dynamically change the appearance of web pages displayed on the browser 202, e.g., in response to user input. In some implementations, the client uses a native executable e.g., as part of a browser extension instead of a browser stored script. Alternatively, the client can use a Java front end instead of, or in addition to, browser scripts. The user input to the browser 202 can be, for example, input to a search interface (e.g., a displayed search engine web page). For example the user 102 can input a search query into the search interface. Additionally, the user can interact with the search interface including selecting one or more search results provided by the search system (e.g., search system 114) in response to a submitted search query.

Similarly, the interaction between the browser 202 and the user 102 can incorporate changes in the displayed content by the browser 202. For example, the scripts 204 can modify the search interface to prompt the user for additional information in order to clarify a search query before submission of the query to the search system (e.g., search system 114 of FIG. 1). The scripts include or make reference to a local model 206. Alternatively, the local model 206 can be located in another location other than the client.

The local model 206 can include, for example, a collection of so-called "trigger" queries. The trigger queries include queries that can be clarified with additional user input. For example, the collection of trigger queries can include common queries that can be clarified with additional information qualifying the query. Thus, each trigger query is identified as having missing information that would provide more relevant search results than the trigger query submitted alone. The system prompts the user to provide that missing information.

The collection of trigger queries can be generated in a number of ways. Generally, a training system can use relative frequency data for particular queries or query terms and whether those terms historically lead to users identifying results directed to particular qualifiers of that query (e.g., location, size, or other information) in order to train a local or remote model. For example, in the case of location based trigger queries, a Bayesian inference model can be used to identify trigger phrases. The training system can use search engine logs and previous user responses to prompts generated by the system to generate the remote model 210 and local model 206. In some implementations, the system uses logs of click-through data identifying results accessed by a collection of users in response to provides search results.

The system can accumulate query terms that frequently lead to query refinements identifying diverse location information (e.g., a query "Chinese restaurant" can later be clarified by the user with 20 different zip codes and 10 different city names). For each of the query terms accumulated, the system counts the number of events where individual users select results that indicate local intent, for example, a map web page or a store locator, after searching using the query term (e.g., "Chinese restaurant" or "Chinese restaurant Kirkland"). For each event, the system can compute additional factors, for example, time, day, country, region, or other information associated with each distinct event. The count of events (e.g., the number of times any query leads to a local result) can be referred to as #(ZIPURL). The count can include events based on regularly submitted queries as well as clarified queries generated from system prompts as described in more detail below.

The system can use the logs and other statistical information to count the number of events where each exact term is used for a particular query term, referred to as #(ZIPURL, TERM). Additionally, the system counts the frequency that a query term occurs given each search event (e.g., the frequency of "Chinese restaurant" as an exact search query), referred to as #(TERM).

The system predicts a probability of individual users selecting local search results in response to a particular query, P(ZIPURL|TERM), which is used to determine whether or not the query is a trigger query for which the user should receive a prompt for additional information. For example, the query can be a trigger query when the predicted probability is greater than a specified threshold value. This probability can be calculated using Bayes rule as:

$$P(ZIPURL \mid TERM) = \frac{P(ZIPURL)}{P(TERM)} P(TERM \mid ZIPURL) = \frac{\#(ZIPURL)}{\#(TERM)} \frac{\#(ZIPURL, TERM)}{\#(ZIPURL)}.$$

In some alternative implementations, the relative frequency of #(ZIPURL) to #(ZIPURL, TERM) is used directly. However, the Bayesian inference model can provide higher precision. This is because P(TERM|ZIPURL) can be based on different historical data than that used to calculate P(ZIPURL)/P(TERM) (i.e., they can be trained on different collections of data). For example, P(TERM|ZIPURL) can use historical data specific to the user while the training of P(ZIPURL)/P(TERM) can be according to specific time of the day or other parameters.

The trigger queries generated through the model training can include clusters of queries or query terms identified as having a high probability of being directed to local results. Additionally, the system identifies trigger queries from queries that have a high cost in time and effort when missing useful clarification. Prior information on time and location can be used to better target the search queries that should be identified as trigger queries in particular circumstances.

Identifying trigger queries includes identifying particular query terms that use local information. However, to provide useful prompts, the relevant user location is used. The addition of a relevant user location distinguishes from simply prompting based on a general frequency of occurrence. For example, if the query "Chinese restaurant" is identified as a trigger query because the query leads to local results and it is known that "Houston" is a frequent location, it does not clarify the query to prompt "Houston" when the user is in another location, e.g., Seattle. Instead, the system uses the user's location information, or locations relevant to the particular user, to localize the prompt to provide relevant prompts. A user can explicitly provide user location information, for example, in prior query refinements input by the user, account or demographic information. Alternatively, the system can derive the user location from other information, e.g., an IP address.

In some implementations, the local model 206 includes particular trigger queries that can be clarified by entering location information (e.g., geographical, relative, zip codes or other addressing data). For example, the query "Chinese restaurant" can return search results for Chinese restaurants in many different locations. However, the user 104 may be looking for a Chinese restaurant in a particular location (e.g., a home neighborhood, near work, etc.). Adding location information to the query allows the search system to return more relevant search results (e.g., search results corresponding to that location).

Additionally, the local model 206 can include other types of queries that can be clarified using one or more qualifiers or other specified parameters. For example, a query "Big LCD TV" can return search results for TV's in many different size ranges. A user, however, may only be interested in TV's having a specified size range. Providing information on a size range for the device can allow the search system to return search results that correspond to that size range.

In another implementation, the local model 206 includes queries where the addition of quotations clarify the search results. For example, a search query corresponding to a first and last name can return results with combinations of the first name and other names and the last name with other first names in addition to results including both names together. However, if quotes are added to the name (e.g., "John Smith"), then the search results will remove the extraneous name combinations. Thus, if the local model 206 recognizes a name in the query, the system can prompt the user to use quotation marks around the name.

In some implementations, additional search operators are used in determining trigger queries. For example, the "OR" operator can be added between query terms. The input search query "Italian Chinese restaurant" can be a trigger query that prompts for a location. However, adding the location may not be sufficient to produce correct results. For example, the additional information can result in the query "Italian Chinese restaurant Kirkland", which is unlikely to produce results when searching for an "Italian Chinese" restaurant in Kirkland. Instead, the system can prompt an OR operator to distinguish between the two cuisines in the search query. This results in a clarified query of "Italian OR Chinese restaurant Kirkland", which can provide relevant results on restaurants of both cuisines for a given locale.

In some implementations, the local model 206 includes historical information about the user 102. For example, one or more past queries of the user 102 may have included a location. Alternatively, the local model 206 can store locations identified by the user in response to prior prompts for additional information. The local model 206 can use this information to build a list of suggested locations for queries where location information would be useful to clarify the query.

The number of locations identified in the local model 206 can be limited to a specified number (e.g., 10 locations) as well as limited according to an elapsed time since submission of the user queries. For example, the locations can include different locations relevant to the particular user including home, work, different neighborhoods in a city, or travel destinations. The system can provide suggested locations depending upon the search query. For example, a query targeting restaurants is typically very local while a query to find an airport is typically more broad. Consequently, the suggested locations prompted by the system can be geographically larger (e.g., regional) for the airport query than the restaurant query. The user's historical information helps identify relevant user locations to suggest when prompting the user to provide local information.

The browser 202 interacts with a server 208. The server 208 includes or makes reference to a remote model 210. In some implementations, the remote model 210 includes a larger collection of trigger queries than the local model 206. Additionally, the remote model 210 can include the same types of trigger queries described above for the local model 206 as well as other types of trigger queries. In particular, the collection of trigger queries in the remote model 210 can be derived by training a model on data (e.g., user query and click logs) in a similar manner as described above with respect to the local model 206. When an input search query is not found in the local model 206, the query can be sent to the remote model 210.

The remote model 210 can also provide a model that is more frequently updated than the local model 206 since it can be more difficult to update local scripting or extension objects frequently. As a result, the remote model 210 can reflect changes in trigger queries based on searching behavior of a collection of users. For example, if a new habit (e.g., drinking a type of latte) becomes popular, location information can become more useful (e.g., to find a nearby location to get the latte) for a query that previously was not a trigger query. As a result, the need for a location prompt increases with popularity of the habit. Thus, an up-to-date remote model 210 can add the "latte" query as a trigger query much faster than the local model 206. Additionally, the remote model 210 can provide dynamic tracking of a particular user or groups of users respond to received prompts. The prompts provided can then be refined based on the user responses. The remote model 210 can also be used to store a larger number of locations associated with particular users than the local model 206.

In some other implementations, the remote model 210 includes a decision tree or other system that is used to predict the user query based on user input that is less than a full query. For example, a user input "pizza r" can be sent to the remote model 210 before the user has completed the query. Sending the user input before the query is complete can reduce delay in interacting with the server 208.

In some implementations, the remote model 210 also determines whether the predicted query is a trigger query. For example, the input "pizza re" can have possible queries "pizza restaurant" and "pizza recipe". The query "pizza restaurant" can be a trigger query. The query "pizza recipe," however, is not a trigger query (e.g., query targeted to more global search results instead of a particular location). The remote model 210 uses the decision tree to determine a probability that the input corresponds to a particular query of a specified number of possible queries as well as whether that predicted query is a trigger query.

The remote model 210 can use statistical information derived from queries from other individuals to calculate a probability that the user input corresponds to a particular query. For example, the relative frequency of the possible queries can be compared to determine a most likely query. Additionally, in some implementations, the user's location is used to identify a subset of queries from other users in associated locations (e.g., the user's location can be inferred from a user's IP address or based on demographic information previously provided by the user). For example, if the user is in Seattle, the remote model 210 can use data based on queries from Seattle (e.g., query logs associated with users in or near Seattle) in determining the predicted query. Limiting to the region of the user can reduce the likelihood of prompting location for regional business that do not exist in the user's area.

The remote model 210 predicts the probability that a given input corresponds to one or more trigger queries that should result in a prompt to the user. In some implementations, the remote model 210 determines which trigger query is more likely. However, the remote model 210 can provide the browser 206 with all possible trigger queries based on a partial query input.

For example, the remote model 210 can enumerate and send all possible trigger queries the user can be forming based on the received input. The remote model 210 can then provide respective probabilities (e.g., the probability that the predicted query is a query that leads to local results, P(ZIPURL|TERM), and should result in a prompt to the user) for those trigger queries (e.g., probability of the partial user input query "pizza re" corresponding to a trigger query "pizza restaurant"=0.8, "pizza review"=0.5). In some implementations, the remote model 210 sends low probability or non-trigger query predictions later to minimize traffic that could delay transmission. For example, the remote server 210 can send not-trigger query "pizza recipe"=0.1 after sending the more likely trigger queries.

The browser 202 (e.g., using local model 206), can compare the final user input with the received predictions. For example, prompting when the actual search query in the final user input corresponds to an identified predicted trigger query. In some implementations, however, the probability that the predicted query is a trigger query has to exceed a specified threshold in order to be considered a trigger query for which a prompt is generated. Additionally, the appropriate type of prompt for that trigger query can be determined.

The remote model 210 can also collect information regarding the user (e.g., user location, time) and resultant final user search query in order to refine the statistics. Time of day can also provide an additional parameter used in the statistics. For example, if more queries for "pizza restaurant" results in location specific URL being selected by users in the evening hours, and the user input is received in the evening, it is more likely that the user query "pizza restaurant" is a trigger query for which the user should be prompted for additional location information to clarify the query. The remote model 210 can also be updated with feedback information from the browser 202 regarding the user's selections from the provided search results based on a submitted clarified query having additional information.

In some implementations, the remote model 210 is optional. For example, the local model 206 can be larger and regularly updated by a remote server. Additionally, in some implementations, the local model includes a decision tree model for predicting queries based on partial input.

Figure 3:
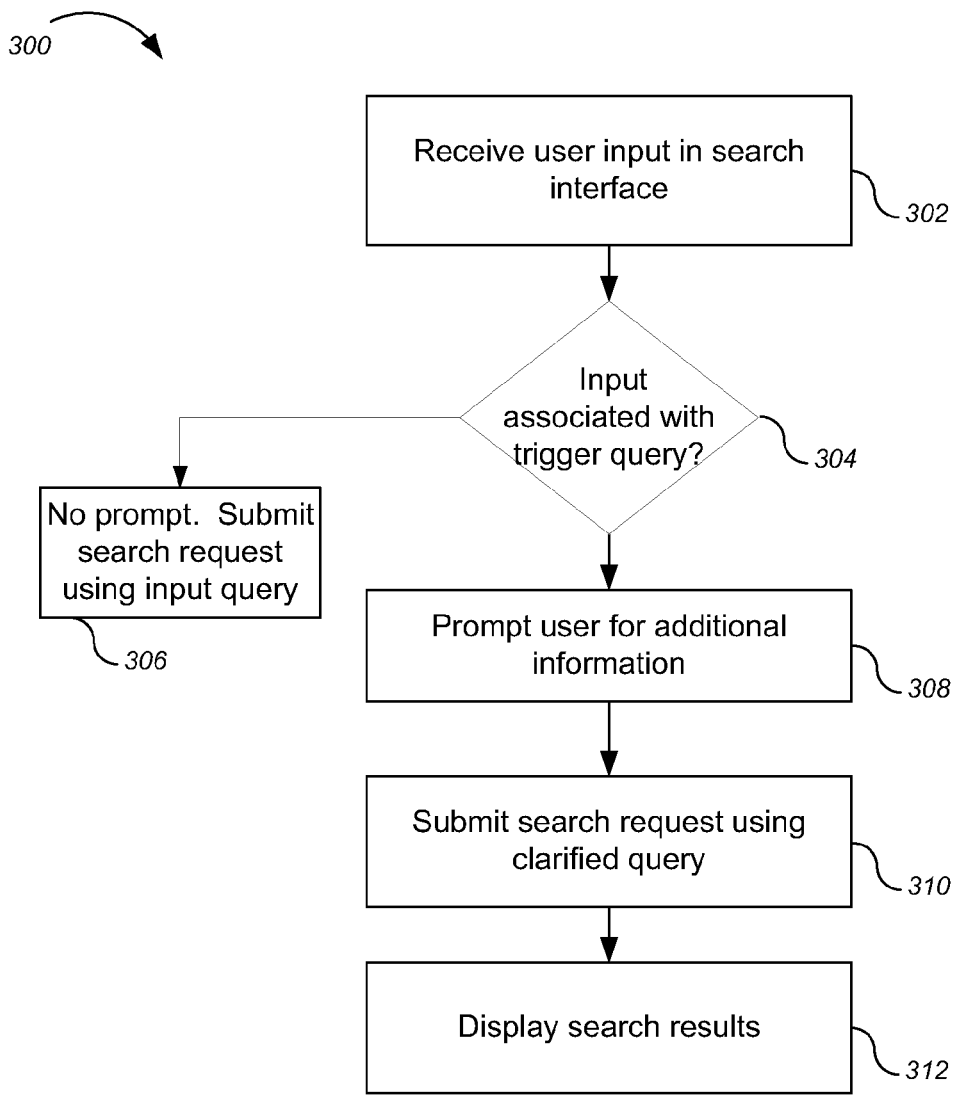
FIG. 3 shows a flow chart of an example method for providing a query clarification prompt.

FIG. 3 shows a flow chart of an example method 300 for providing a query clarification prompt. For convenience, the method 300 will be described with respect to a system that performs the method 300. The system receives 302 a user input in a search interface. The received user input can be a search query or portion of a search query. For example, the received user input can be the full query, e.g., "Chinese restaurant", or a portion of the full query e.g., "Chinese re".

The system determines 304 whether the input is associated with a trigger query. The system can determine that the user input is associated with a particular trigger query using a local model (e.g., local model 206) or a remote model (e.g., remote model 210). Determining whether the user input is associated with a particular trigger query is described with respect to FIG. 4.

Different metrics can be used to determine whether a user input is a trigger query. For example, in some implementations, a probability that the query results in users selecting local results is used. Alternatively, different queries can be scored according to one or more criteria indicating the need to provide a prompt for the query. In yet other implementations, a query that matches any of a collection of queries in a local or remote model is a trigger query.

If the input is not associated with a trigger query, the system does not prompt the user for additional information and submits 306 the input user query once the user executes a search in the search interface.

Figure 5:
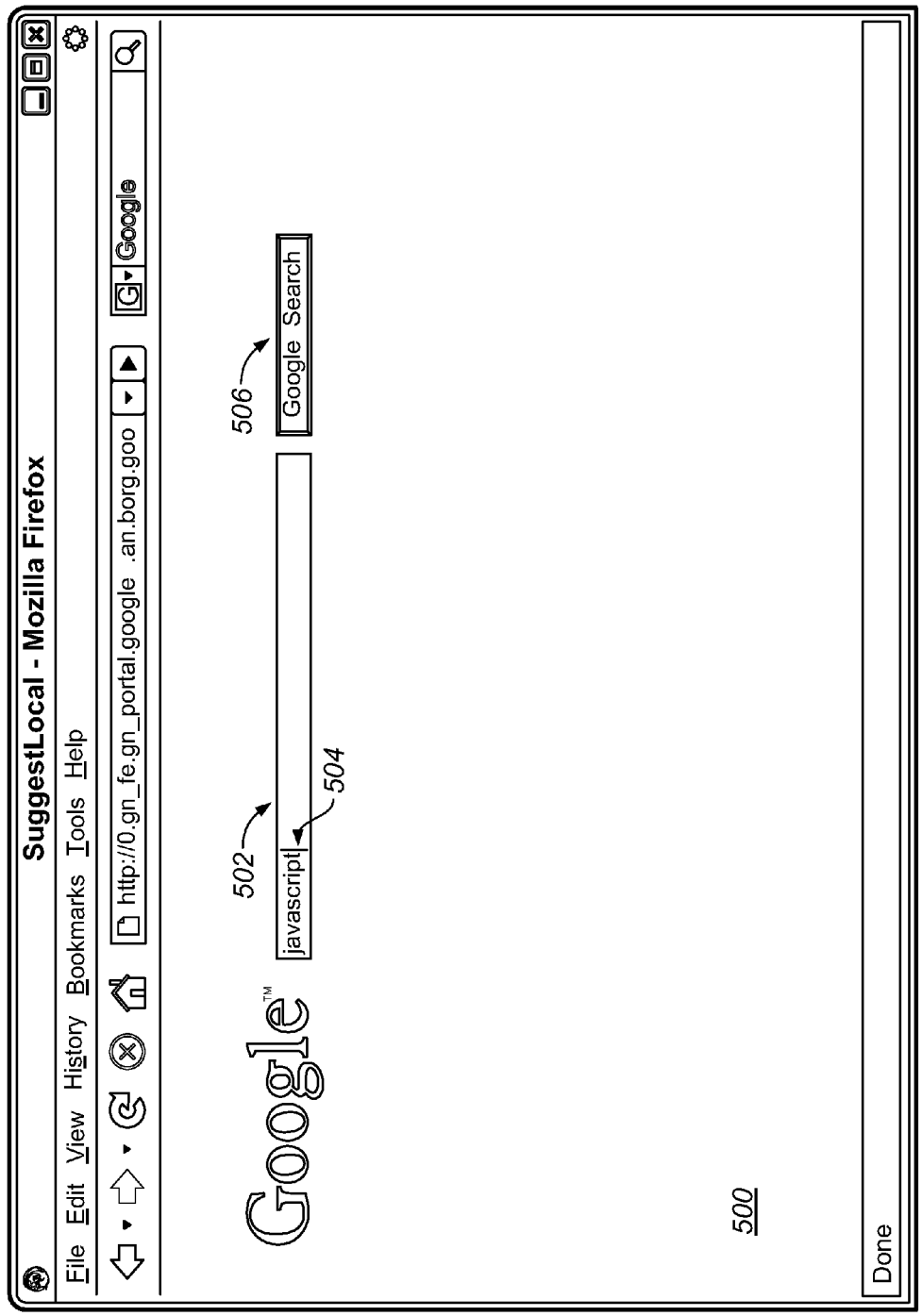
FIG. 5 shows an example of a search interface without a prompt.

FIG. 5 shows an example of a search interface 500 for a browser without a prompt. Search interface 500 includes an input field 502 for receiving user input of a search query. In particular, input field 502 includes search query 504 "JavaScript". The search interface 500 also includes a submission button 506 for initiating the search (e.g., for submitting the search query to the search system). The search query 504 is not a trigger query. Consequently, there is no prompt for additional information provided in the search interface 500.

As shown in FIG. 3, if the user input is associated with a trigger query, the system 308 prompts the user for additional information. The prompt for additional information can include modifying the search interface to include the prompt. For example, a script in the browser can be executed when a trigger query is detected by the local or remote model to generate a prompt in the user interface corresponding to the type trigger query.

In some implementations, the script generates a drop down menu in the search interface from which additional information is presented to the user for selection. For example, if the prompt is a location, the generated drop down menu can include a list of localities relevant to the user query. The level of granularity in the list of localities can be query specific. For example, if the user query is "Chinese restaurant" the suggested localities can be focused on particular neighborhoods in a large city (e.g., as identified from prior user responses to the prompt). In contrast, another query can be suitable for less granularity. For example, the user query "airport" can use broader localities. For example, the suggested localities can be regional instead of neighborhood (e.g., Seattle-Tacoma metro area instead of Kirkland, Wash.).

Figure 6:
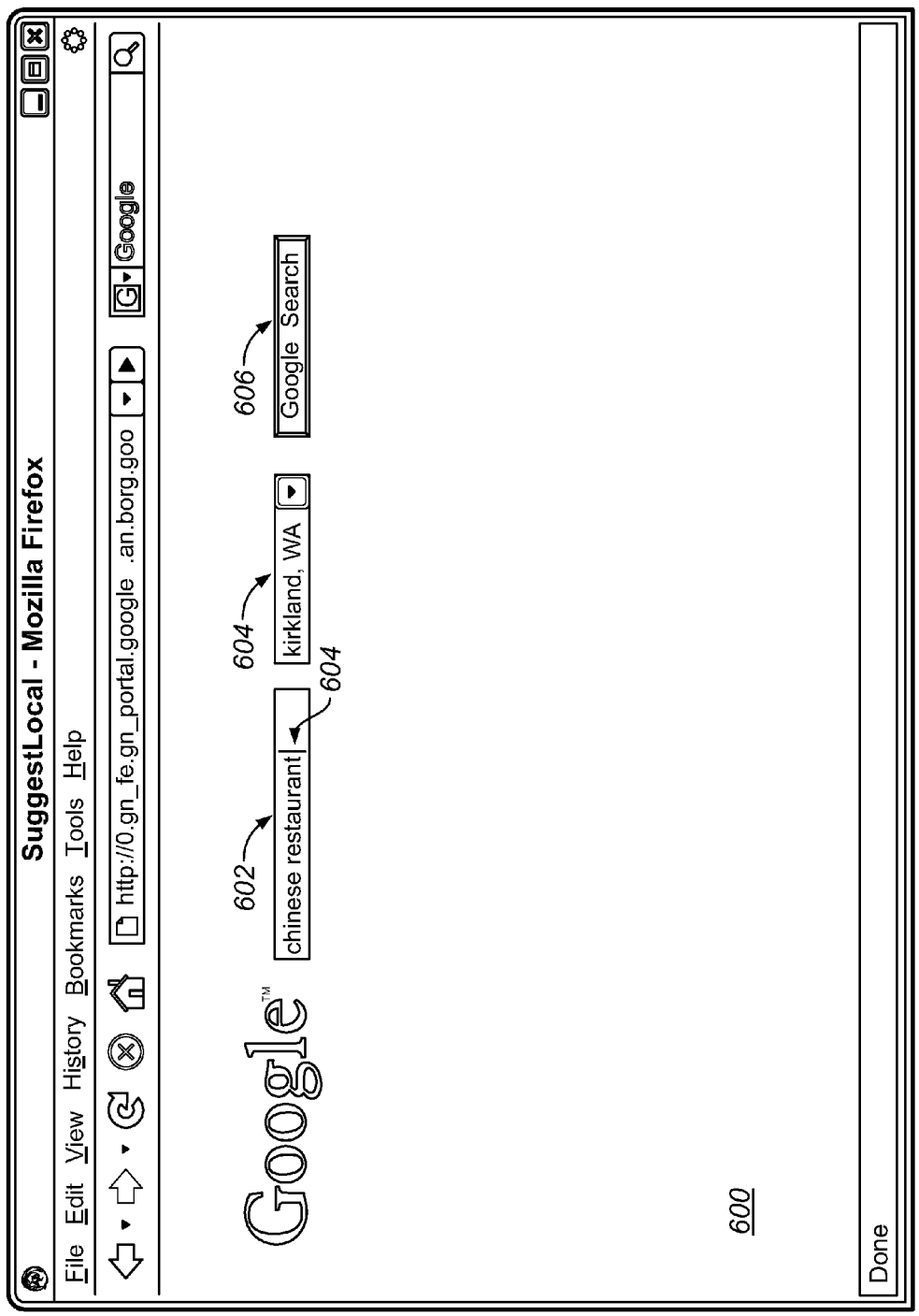
FIG. 6 shows an example of a search interface including a clarification drop down menu prompt.

FIG. 6 shows an example of a search interface 600 in a browser including a clarification drop down menu prompt. Search interface 600 includes an input field 602 for receiving user input of a search query. In particular, input field 602 includes search query 604 "chinese restaurant". The search interface 600 also includes a submission button 606 for initiating the search (e.g., for submitting the search query to the search system).

Additionally, because the query was identified as a trigger query, the search interface 600 is a modified search interface, for example, from search interface 500 of FIG. 5. In some implementations, the search interface 600 is modified (e.g., using JavaScript), as soon as the system determines that the query is a trigger query or predicted to be a trigger query. The modification includes the addition of a drop down menu 604 in the search interface 600. The drop down box 604 includes one or more suggestions for additional information to be added to the input search query 604. In the example drop down box 604 shown, the suggested additional information is one or more localities to clarify the query "chinese restaurant" with a particular location (Kirkland, Wash.).

In some other implementations, the script generates a text prompt to alert the user. For example, if the user query can be clarified with location information, the text prompt can indicate that the user can include a location to get local information.

Figure 7:
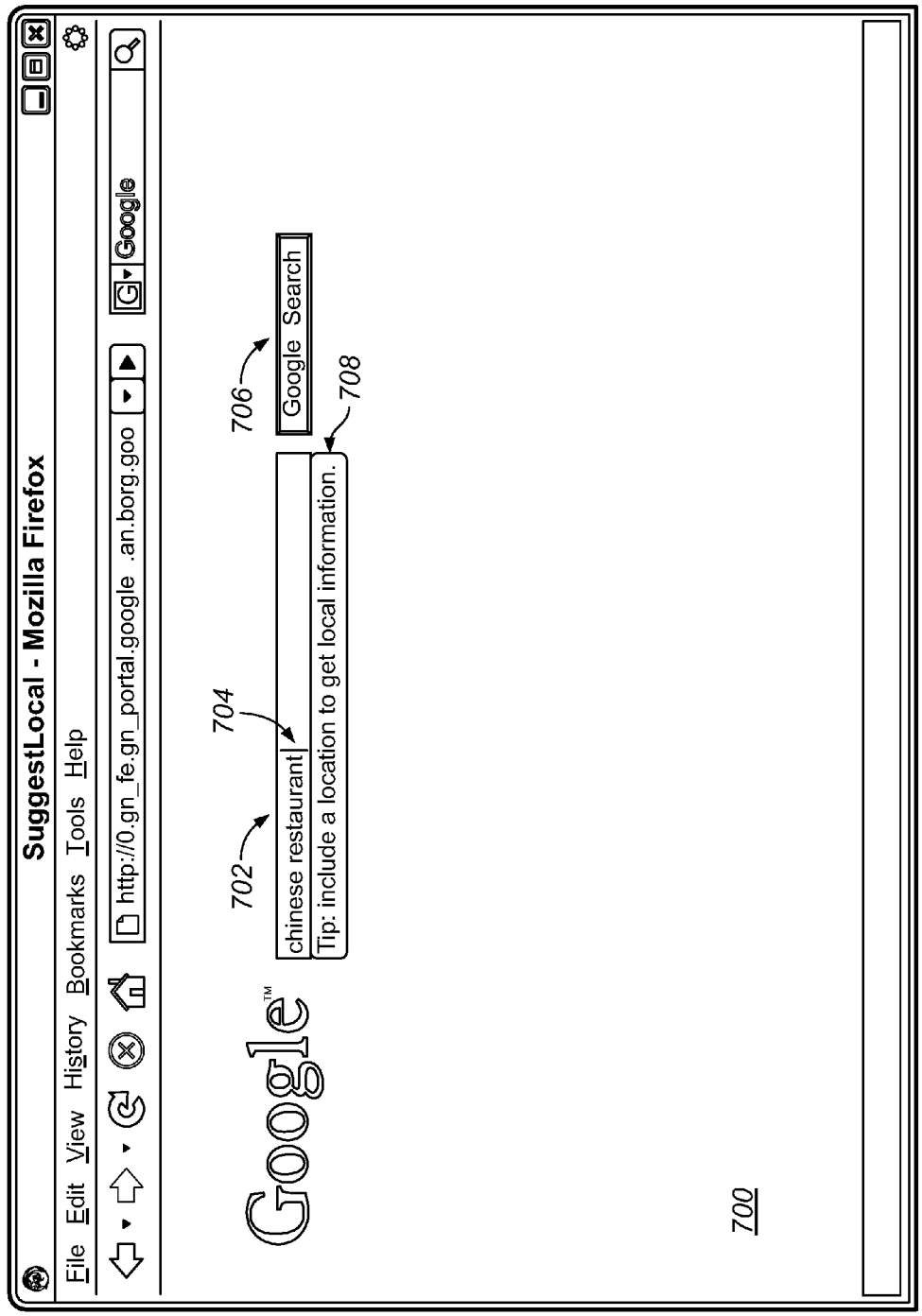
FIG. 7 shows an example of a search interface including a clarification tip prompt.

FIG. 7 shows an example of a search interface 700 including a clarification tip prompt. Search interface 700 includes an input field 702 for receiving user input of a search query. In particular, input field 702 includes search query 704 "chinese restaurant". The search interface 700 also includes a submission button 706 for initiating the search (e.g., for submitting the search query to the search system).

Additionally, because the query was identified as a trigger query, the search interface 700 is a modified search interface, for example, from search interface 500 of FIG. 5. The modification includes the addition of a tip prompt 708 in the search interface 700. The tip prompt 708 provides information suggesting how the user query can be clarified. For example, the tip prompt 708 suggests that including a location with the query provides local search results. The tip prompt 708 can be any suggestion of a modifier to the search query that can be used to clarify the query.

If the user provides additional information, the additional information is used to form a clarified query. As shown in FIG. 3, the system submits 310 a search request using the clarified query. For example, the clarified query can be submitted to the search system 114 of FIG. 1. The system then displays 312 search results received from the search system, e.g., using the browser 202 of FIG. 2.

Figure 8:
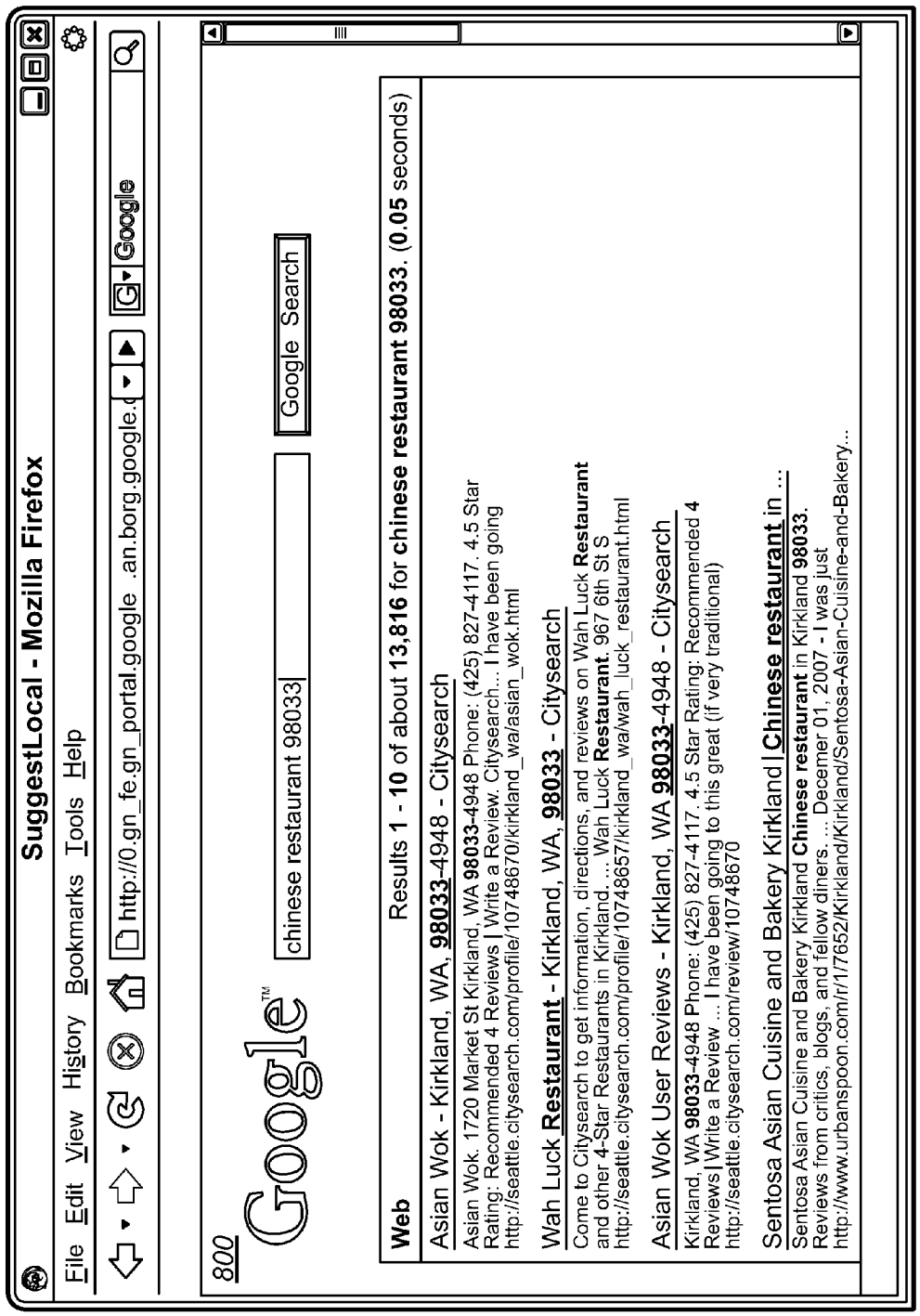
FIG. 8 shows example search results for a clarified query.

FIG. 8 shows example search results 800 for a clarified query. For example, the user, in response to the tip prompt of FIG. 7, can provide additional information. In this example, the user added a zip code to "chinese restaurant" forming a clarified query. The zip code can identify a particular city or neighborhood with a larger city. In this particular example, the input zip code identifies Kirkland, Wash. Consequently, the search results returned for the clarified query are local to Kirkland, Wash. Chinese restaurants. In some implementations, the zip code is converted into locations of different geographic size based on the type of local information relevant to the particular trigger query. For example, while "chinese restaurant" may be a neighborhood level query, airport can be regional.

Figure 4:
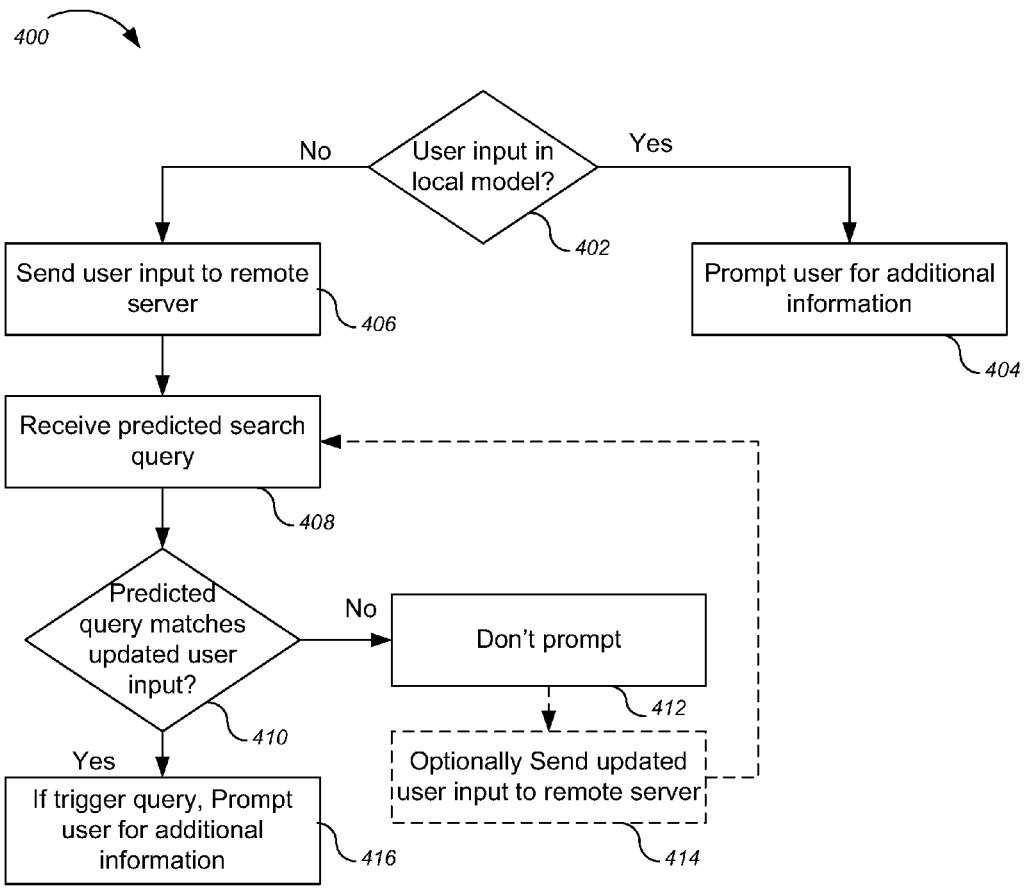
FIG. 4 shows a flow chart of an example method for determining whether a user input is associated with a trigger query.

FIG. 4 shows a flow chart of an example method 400 for determining whether a user input is associated with a trigger query. For convenience, the method 400 will be described with respect to a system that performs the method 400.

The system determines 402 whether the received user input corresponds to a trigger query in the local model. In some implementations, the system compares a user input query to trigger queries stored in the local model in order to identify a particular input as a trigger query. Alternatively, in other implementations, the system makes multiple determinations based on the user input as it is being entered into the search interface. For example, the system can compare the user input with the local model as each character or specified number of characters is entered into the search interface.

If the user input corresponds to a trigger query in the local model, the system prompts 404 the user for additional information according to the type of trigger query in order to generate a clarified query as described above with respect to FIG. 3.

If the user input does not correspond to a query in the local model, the system sends 406 the received user input to a remote server including a remote model. The remote model determines a probability that the user input corresponds to a particular query. In some implementations, the system also sends information regarding the user including the user location (e.g., implicitly using IP address or explicitly based on prior user input of location).

The system receives 408 one or more predicted search queries based on the determined probability that the user input corresponds to particular queries (e.g., from the remote model). In particular, the remote model can provide predicted trigger queries and their associated probabilities based on the user input. When the predicted search query is a trigger query, it is identified as a trigger query when returned to the browser.

Additionally, in some implementations, the predicted search query is also returned with a score identifying the confidence for the predicted search query. A specified threshold confidence score can be required to prompt the user for additional information. In some other implementations, if the remote model does not provide a predicted query if there the input text does not result in a predicted trigger query having the threshold probability.

Alternatively, the predicted queries can each be associated with a score. The score indicates the likelihood that the particular query is directed to local information (e.g., searching with the query leads to users selecting local results). The system can use a threshold score value in determining whether or not the query is a trigger query that results in a user prompt. In another implementation, a query that matches any of a collection of queries in a local or remote model is a trigger query without regard to a probability or score value.

The system determines 410 whether the predicted search query matches an updated user input. For example, the user can have input additional characters to the search interface following submission of the user input to the remote server. If the predicted search query does not match the updated user input, the system does not prompt 412 the user for additional information. Additionally, the system can optionally send 414 the updated user input back to the remote server to identify a new predicted search query.

If the predicted search query does match the updated user input, and the predicted query is a trigger query, then the system prompts 416 the user for additional information as described with respect to FIG. 3.

In some implementation, even if the predicted search query matches the user input, additional updates to the user query cause the system to send the user query to the server including those additional updates. A new predicted query or a change in the score can be returned. In some implementations, if the new predicted query is not a trigger query or if the score falls below a specified threshold amount, then the prompt is removed from the search interface. For example, for the user input "pizza" the system can provide a prompt. As the user continues adding letters to the query to "pizza re", this can result in a predicted query of "pizza restaurant" and therefore the prompt is not removed. Additional user input to "pizza rec" can limit the possible query to "pizza recipe". Since "pizza recipe" is not a trigger query, the prompt is removed from the search interface.

Figure 9:
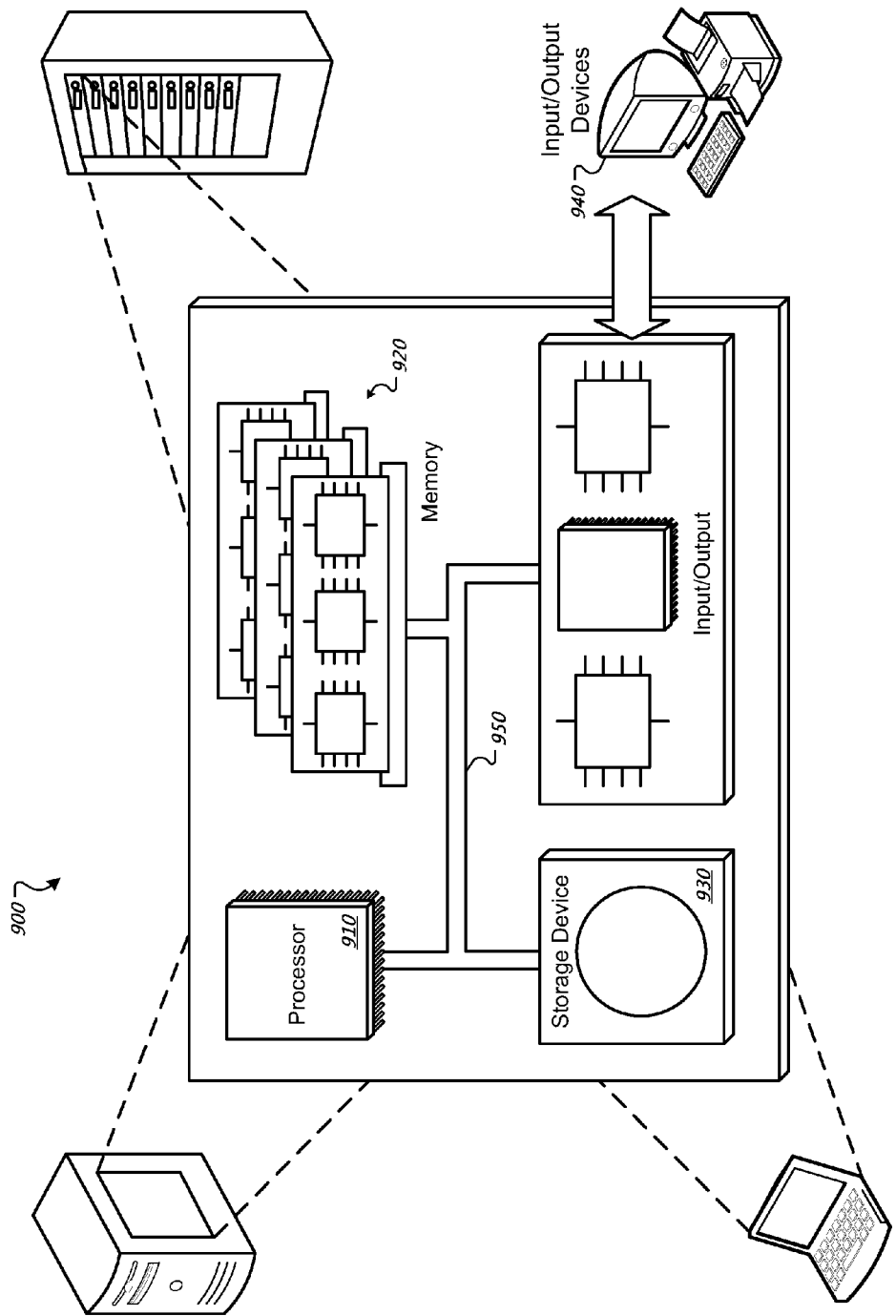
FIG. 9 shows a schematic diagram of an example computer system.

FIG. 9 shows a schematic diagram of an example computer system 900. The system 900 can be used for the operations described in association with the method 300 shown in FIG. 3, according to one implementation or the method 400 shown in FIG. 4, according to another implementation.

The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940. In some embodiments, a parallel processing set of systems 900 connected over a network may be employed, clustered into one or more server centers.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can include, for example, a hard disk device, an optical disk device, or some other large capacity storage device.

The input/output device 940 provides input/output operations for the system 900. In one implementation, the input/output device 940 includes a keyboard and/or pointing device. In another implementation, the input/output device 940 includes a display unit for displaying graphical user interfaces.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   receiving, at a search system from a user device associated with a user, user input comprising one or more characters of a partial search query;
   determining a location of the user device;
   determining a predicted query for the one or more characters of the partial search query, the predicted query comprising the one or more characters of the partial search query and a name of the location of the user device; and
   providing the predicted query to the user device for presentation to the user prior to the user submitting a search query to the search system.

2. The method of claim 1, wherein determining a predicted query for the one or more characters of the partial search query comprises:
   determining, for each query matching the one or more characters of the partial search query in a collection of queries, a respective likelihood of a user selecting local search results provided in response to the query; and
   identifying a first query matching the one or more characters of the partial search query in the collection of queries having a likelihood that satisfies a threshold.

3. The method of claim 2, wherein the collection of queries comprises queries submitted by users from a geographic area that includes the location of the user device.

4. The method of claim 1, wherein providing the predicted query to the user device comprises providing the predicted query to the user device prior to providing search results in response to the user input.

5. The method of claim 1, wherein in response to receiving the predicted query, the user device presents a search interface that prompts the user to select the predicted query, and wherein upon user selection of the predicted query, the user device submits the predicted query as a search query to the search system.

6. The method of claim 5, wherein the search interface prompts the user to select the predicted query in a drop down menu.

7. The method of claim 1, further comprising:
   determining a geographic region associated with an internet protocol (IP) address of the user device; and
   determining the name of the location of the user device based on a name of the geographic region associated with the IP address of the user device.

8. The method of claim 1, further comprising:
   determining the name of the location of the user device based on respective names of one or more locations relevant to the user.

9. The method of claim 8, further comprising:
   determining the respective names of the one or more locations relevant to the user including determining respective names of one or more prior locations occurring in prior query refinements received from the user.

10. The method of claim 8, further comprising:
    determining the respective names of the one or more locations relevant to the user including determining a name of a location associated with a user profile of the user.

11. A system comprising:
    one or more computers and one or more storage devices storing instructions that are operable, when executed by the one or more computers, to cause the one or more computers to perform operations comprising:

receiving, at a search system from a user device associated with a user, user input comprising one or more characters of a partial search query;

determining a location of the user device;

determining a predicted query for the one or more characters of the partial search query, the predicted query comprising the one or more characters of the partial search query and a name of the location of the user device; and providing the predicted query to the user device for presentation to the user prior to the user submitting a search query to the search system.

12. The system of claim 11, wherein determining a predicted query for the one or more characters of the partial search query comprises:

determining, for each query matching the one or more characters of the partial search query in a collection of queries, a respective likelihood of a user selecting local search results provided in response to the query; and identifying a first query matching the one or more characters of the partial search query in the collection of queries having a likelihood that satisfies a threshold.

13. The system of claim 12, wherein the collection of queries comprises queries submitted by users from a geographic area that includes the location of the user device.

14. The system of claim 11, wherein providing the predicted query to the user device comprises providing the predicted query to the user device prior to providing search results in response to the user input.

15. The system of claim 11, wherein in response to receiving the predicted query, the user device presents a search interface that prompts the user to select the predicted query, and wherein upon user selection of the predicted query, the user device submits the predicted query as a search query to the search system.

16. The system of claim 15, wherein the search interface prompts the user to select the predicted query in a drop down menu.

17. The system of claim 11, wherein the operations further comprise:

determining a geographic region associated with an internet protocol (IP) address of the user device; and determining the name of the location of the user device based on a name of the geographic region associated with the IP address of the user device.

18. The system of claim 11, wherein the operations further comprise:

determining the name of the location of the user device based on respective names of one or more locations relevant to the user.

19. The system of claim 18, wherein the operations further comprise:

determining the respective names of the one or more locations relevant to the user including determining respective names of one or more prior locations occurring in prior query refinements received from the user.

20. The system of claim 18, wherein the operations further comprise:

determining the respective names of the one or more locations relevant to the user including determining a name of a location associated with a user profile of the user.

21. A computer program product, encoded on one or more non-transitory computer storage media, comprising instructions that when executed by one or more computers cause the one or more computers to perform operations comprising:

receiving, at a search system from a user device associated with a user, user input comprising one or more characters of a partial search query;

determining a location of the user device;

determining a predicted query for the one or more characters of the partial search query, the predicted query comprising the one or more characters of the partial search query and a name of the location of the user device; and providing the predicted query to the user device for presentation to the user prior to the user submitting a search query to the search system.

* * * * *